United States Patent [19]

Paul

[11] 4,177,430

[45] Dec. 4, 1979

[54] ADAPTIVE NOISE CANCELLING RECEIVER

[75] Inventor: James E. Paul, Anaheim, Calif.

[73] Assignee: Rockwell International Corporation, El Segundo, Calif.

[21] Appl. No.: 884,093

[22] Filed: Mar. 6, 1978

[51] Int. Cl.$^2$ .............................................. H04B 1/12
[52] U.S. Cl. .................................. 325/475; 325/477; 325/480; 328/163
[58] Field of Search .................. 325/42, 62, 323, 324, 325/472–477, 479, 480; 179/1 P; 333/18, 70 T, 28 R, 28 T; 328/163, 167, 165; 364/724, 728

[56] References Cited

U.S. PATENT DOCUMENTS

| | | | |
|---|---|---|---|
| 2,991,358 | 7/1961 | Wilcox | 325/475 |
| 3,126,449 | 3/1964 | Shirman | 325/474 |
| 3,387,222 | 6/1968 | Hellwarth et al. | 325/474 |
| 3,769,591 | 10/1973 | Brown et al. | 325/474 |
| 3,803,357 | 4/1974 | Sacks | 179/1 P |
| 3,876,943 | 4/1975 | Watt et al. | 325/479 |
| 3,953,802 | 4/1976 | Morris et al. | 325/474 |
| 4,052,559 | 10/1977 | Paul et al. | 179/1 P |

OTHER PUBLICATIONS

"Adaptive Noise Cancelling," Widrow et al., IEEE Proceedings, vol. 63, No. 12, Dec. 1975.

*Primary Examiner*—Robert L. Griffin
*Assistant Examiner*—Jin F. Ng

*Attorney, Agent, or Firm*—L. Lee Humphries; H. Frederick Hamann; Rolf M. Pitts

[57] ABSTRACT

A receiving system is described which has the capability of substantially cancelling broadband noise, such as impulse noise, atmospheric noise, electrical line noise and receiver front end noise, from a selected radio frequency passband. In a first embodiment, a desired radio frequency passband is selected and converted to a broadband intermediate frequency (IF) signal, which is applied in parallel to the inputs of first and second frequency channels. When broadband noise is present in the broadband IF signal, the first frequency channel develops a desired audio signal in the presence of an undesired first broadband noise signal, while the second frequency channel develops an undesired second broadband noise signal which is correlated with the first broadband noise signal. An adaptive transversal filter is responsive to the second broadband noise signal and to an output signal for adaptively developing an estimate of the first broadband noise. The estimate of the first broadband noise signal is subtracted from the combination of the desired audio signal and the first broadband noise signal in order to cancel out the first and second broadband noise signals and substantially develop only the desired audio signal as the output signal. When no broadband noise is present in the broadband IF signal, the adaptive filter automatically shuts itself off and the first frequency channel only develops the desired audio signal. Thus, regardless of whether or not broadband noise is present, the output signal is substantially comprised of only the desired audio signal.

16 Claims, 3 Drawing Figures

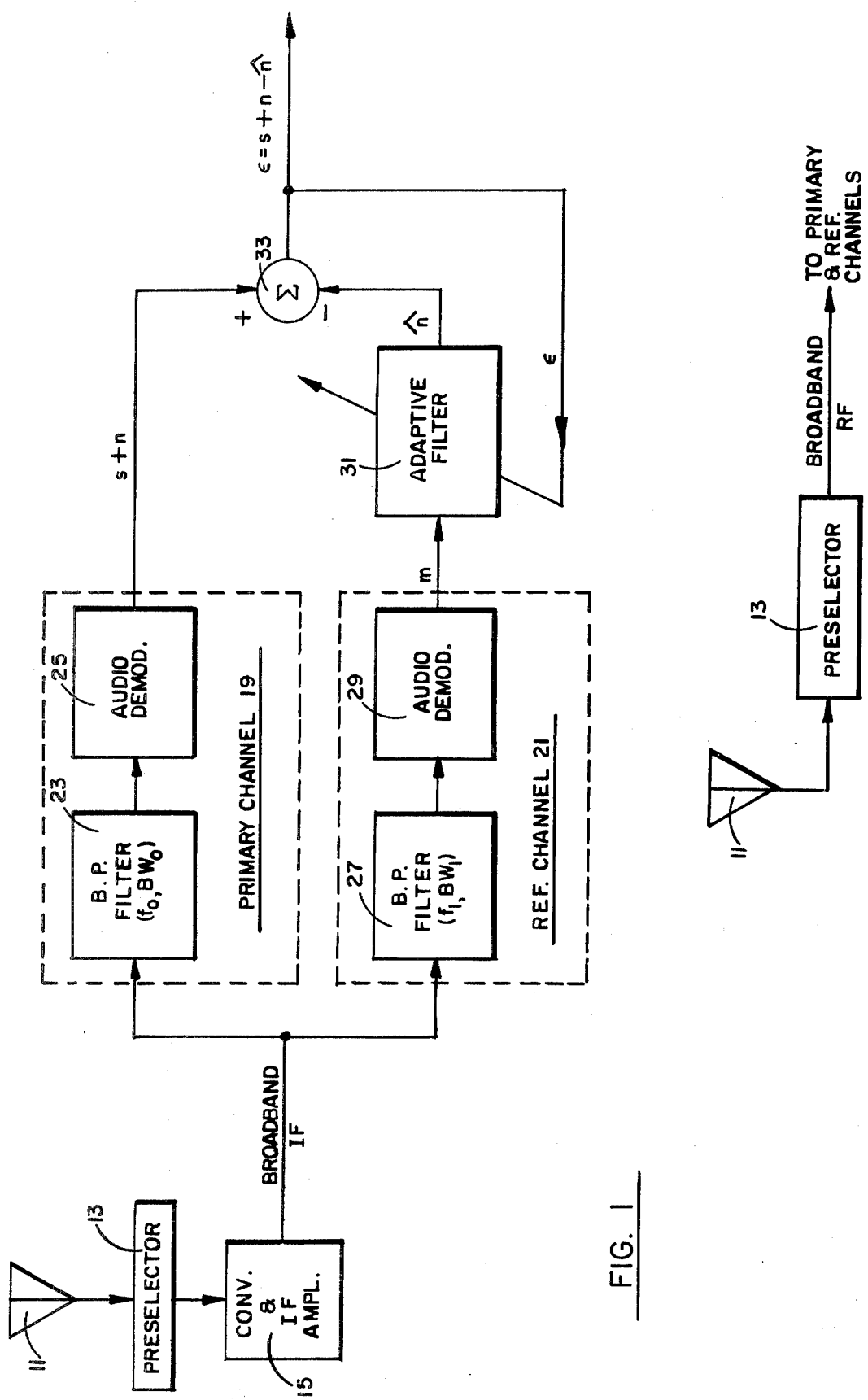

ADAPTIVE NOISE CANCELLING RECEIVER

BACKGROUND OF THE INVENTION

1. Field of the Invention

This invention relates to communication systems and particularly to a receiving system for substantially cancelling undesired broadband noise in the same frequency spectrum as a desired signal.

2. Prior Art Statement

Many different prior art devices, apparatuses and receiving systems have been proposed for separating, removing cancelling noise or interference from an input signal.

The article of Bernard Widrow et al, entitled "Adaptive Noise Cancelling: Principles and Applications", found on pages 1692–1716 of Proceedings of the IEEE, Vol. 63, No. 12, Dec. 1975, teaches the concept of adaptive noise cancelling. The adaptive noise cancelling concept, as shown in FIG. 1 on page 1693, uses a two input device to which is respectively applied a primary input containing a signal corrupted by additive noise or interference, and a reference input containing noise correlated in some unknown way with the primary noise. The reference input is adaptively filtered and subtracted from the primary input to obtain a resultant estimate of the signal. Basically, Widrow et al is a time-waveform canceller.

U.S. Pat. No. 4,052,559 discloses a one input, speech filtering device which utilizes a transversal filter to provide an estimate of only the longer correlation time-period "noise" that is contained in an input speech-bearing signal and a subtractor to subtract the longer correlation time-perod "noise" from the input speech-bearing signal to obtain substantially only the shorter correlation time-period speech component of the input speech-bearing signal as the signal remnant. Unlike the device of Widrow et al, the speech filtering device of U.S. Pat. No. 4,052,559 is a linear predictor which predicts the correlated noise component that is contained in the input speech-bearing signal.

U.S. Pat. No. 3,126,449 basically discloses a nonlinear audio noise blanker, which detects noise bursts and interrupts the passage of audio during the noise bursts. More specifically, this patent discloses a noise discriminator circuit having three parallel branches, each branch consisting of a different band pass filter in series with an integrator-detector/Schmitt trigger circuit combination. The outputs of the three parallel branches are selectively applied to various logic gates to develop a control signal which, by way of a one-shot multivibrator and a holdover circuit, controls an audio gate for the purpose of accomplishing the noise discrimination function.

U.S. Pat. No. 3,803,357 discloses a noise filter device which operates as an automatic noise canceller based on audio band segmentation and selective gain recombination. The noise filter device comprises a plurality of gain controllable, contiguous, narrow band nonlinear filters connected to a signal source, a noise tracker and a summing amplifier. The noise tracker is also connected to the signal source and essentially controls the ability of each of the narrow band filters to pass a signal as a function of the noise level that the noise tracker detects in the signal. The summing amplifier combines the spectral outputs of the narrow band filters in the proper power phase relationship.

U.S. Pat. No. 3,953,802 discloses an adjacent channel rejector for use in communications systems. Basically, this adjacent channel rejector is a nonlinear noise blanker. In this patent the IF signal of the receiver is applied through an IF amplifier and demodulator to an inhibit gate. The IF signal is also applied to a high gain amplifier. The output of the high gain amplifier is applied through a narrow band filter/demodulator to a first input of an amplitude comparator, as well as through a wide band filter/demodulator to a second input of the amplitude comparator. When a received signal has a center frequency outside a predetermined channel bandwidth, the high gain amplifier is driven into saturation, subsequently causing the comparator to apply an inhibit signal to the inhibit gate to prevent the received signal from passing through the inhibit gate.

U.S. Pat. No. 3,769,591 discloses a frequency selective pulse receiving system which performs a function similar to that performed by the system of U.S. Pat. No. 3,953,802. This pulse receiving system comprises a main channel having a pass band to receive incoming signals, three auxiliary channels respectively having pass bands equal to, above, and below the desired pass band of the receiver, and a comparator circuit responsive to the output signals of the three auxiliary channels for controlling the operation of a suppression device to either pass or suppress the output of the main channel as a function of the amplitude relationships of the output signals of the three auxiliary channels. In this manner the system automatically notches out interference.

Each of the above-described systems disclosed in U.S. Pat. Nos. 3,126,449; 3,802,357; 3,953,802; and 3,769,591 achieves noise cancellation by distorting, blanking, inhibiting or otherwise modifying the desired signal, as well as the noise, whenever noise is detected. As a result, none of these systems could properly operate in the presence of intense and continuous broadband noise.

None of the above-described prior art published article and U.S. patents teaches or suggests an adaptive noise cancelling receiver which includes the combination of: a circuit for selecting a desired broadband frequency signal containing a desired signal; first and second frequency channels responsive to the broadband frequency signal for respectively generating first and second audio signals, with the first audio signal containing the desired signal in the presence of a first broadband noise and the second audio signal containing a second broadband noise that is correlated with the first broadband noise; an adaptive filter responsive to the second broadband noise and to an output signal for adaptively developing an estimate of the first broadband noise; and a combiner for combining the estimate of the first broadband noise with the first audio signal to substantially cancel out the first and second broadband noises and develop as the output signal a signal which substantially contains only the desired signal.

SUMMARY OF THE INVENTION

Briefly, an adaptive noise cancelling receiver is provided which has the capability of substantially cancelling broadband noise, such as impulse noise, atmospheric noise, electrical line noise and receiver front end noise, from a selected radio frequency passband which contains a desired signal. In a first embodiment a preselector selects a desired radio frequency passband which is converted to a broadband intermediate frequency (IF) signal. This broadband IF signal is applied to first and second frequency channels, which are each comprised of a filter/demodulator combination. The output of the first frequency channel is a primary audio signal which is applied to a first input of a combiner. The output of the second frequency channel is a second audio signal. This second audio signal is applied to an adaptive filter to generate a filtered or reference signal which is applied to a second input of the combiner. Only the primary audio signal contains the desired signal. The output of the combiner, which is the difference between the primary and reference audio signals, is supplied as an error signal to the adaptive filter. In its operation, the adaptive filter cancels the common signal components between the second audio signal and the error signal by adaptively adjusting the amplitude, phase and spectral transfer function of the second audio signal to match the corresponding components in the error signal. As a result, the combiner cannot cancel the desired signal, but can only cancel broadband noise components that the common to both the primary and reference audio signals. When no broadband noise is present in the broadband IF signal, no noise components are common to both the primary and reference audio signals and, as a result, the adaptive filter automatically shuts itself off. Thus, regardless of whether or not broadband noise is present in the broadband IF signal, the error signal is substantially comprised of only the desired signal. The desired signal is not filtered or passed through any non-linear device, such as an inhibitor or gate, to achieve the noise cancellation.

It is therefore an object of this invention to provide an improved noise cancelling receiver.

Another object of this invention is to provide a receiver capable of rejecting adjacent or nearby channel interference (such as splatter) and broadband noise (such as power line noise and atmospheric noise).

A further object of this invention is to provide a communications receiver with an improved noise factor.

BRIEF DESCRIPTION OF THE DRAWINGS

These and other objects, features, and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 1 illustrates a simplified block diagram of the invention;

FIG. 2 illustrates a modification that can be made to FIG. 1 to produce a second embodiment of the invention.

DESCRIPTION OF THE PREFERRED EMBODIMENTS

Figure 3:
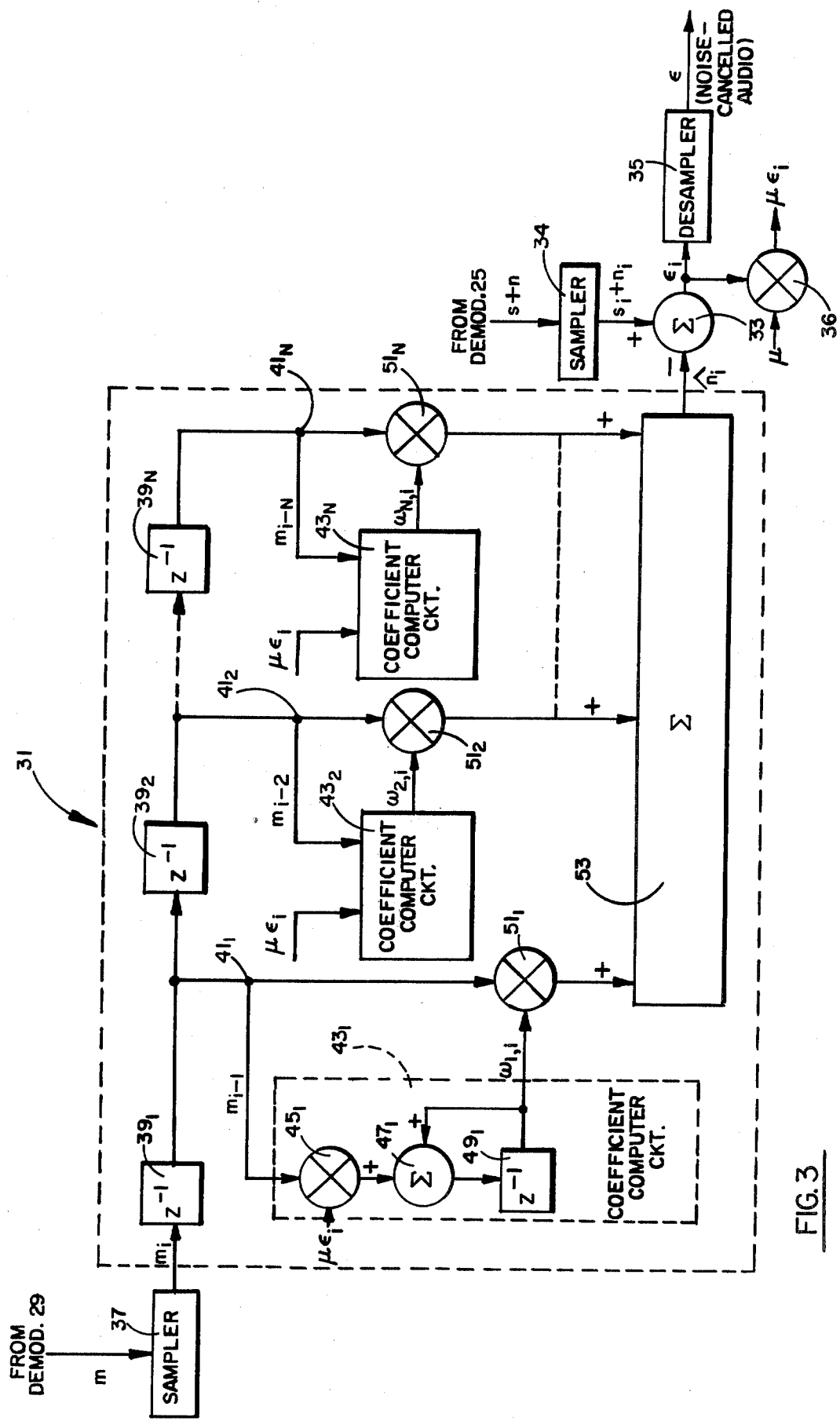
FIG. 3 illustrates a modification that can be made to either FIG. 1 or FIG. 2 to produce a third embodiment of the invention.

Referring now to the drawings, FIG. 1 discloses a simplified block diagram of the invention.

One of a plurality of radio frequency (RF) passband signals being received by antenna 11 is selected and amplified by a preselector or RF amplifier 13. Assume that the selected passband signal at the output of the preselector 13 contains both a desired signal and an undesired broadband noise, such as impulse noise, atmospheric noise, electrical line noise or receiver front end noise. The selected RF passband from the preselector 13 is applied to a converter and intermediate frequency (IF) amplifier 15 to develop an amplified IF bandpass signal according to techniques well understood in the art.

The IF signal from the converter and IF amplifier 15 is a broadband IF passband signal which is applied in parallel to primary and reference (frequency) channels 19 and 21. It should be noted that the converter and IF amplifier 15 can also generate receiver front end noise. By using a common front end, comprised of the preselector 13 and converter and IF amplifier 15, both of the channels 19 and 21 are similarly affected by common receiver front end noise, as well as automatic gain control.

The primary channel 19 is comprised of a bandpass filter 23 to select a first band of frequencies within the passband of the broadband IF signal and an audio demodulator 25 to develop a first or primary audio signal from the first band of frequencies. The reference channel 21 is comprised of a bandpass filter 27 to select a second band of frequencies within the passband of the broadband IF signal and an audio demodulator 29 to develop a second audio signal from the second band of frequencies. Channel selectivity is such that the selected second band of frequencies contains substantially no signal energy of either the desired signal or any other received signal (other than possibly noise). The filters 23 and 27 can be sharp bandpass filters, such as mechanical or crystal filters to select the first and second bands of frequencies. These first and second bands of frequencies can be respectively varied to lie in adjacent, overlapping or separated portions of the frequency spectrum of the passband of the broadband IF signal. The passband of filter 23 can have a center frequency $f_0$ and a bandwidth $BW_0$, while the passband of filter 27 can have a center frequency $f_1$ and a bandwidth $BW_1$.

When broadband noise is present in the broadband IF signal being commonly applied to the inputs of the primary and reference channels 19 and 21, the primary audio signal (s+n) from demodulator 25 contains the desired signal s plus a first broadband noise n, while the second audio signal from demodulator 29 substantially contains a second broadband noise m, which is correlated with the noise n. The noise m is correlated with the noise n since broadband noise is highly correlated across the adjacent or nearby frequency channels 19 and 21.

The second audio signal from demodulator 29 is applied to an adaptive filter 31, which can be an adaptive transversal filter, to enable the filter 31 to generate a filtered or reference audio signal. This reference audio signal if substantially an estimate $\hat{n}$ of the broadband noise n contained in the primary audio signal. The reference audio signal or estimated noise $\hat{n}$ is subtracted in a combiner 33 from the desired signal plus noise s+n, or primary audio signal, in order to substantially cancel out the first and second broadband noises and develop an error signal $\epsilon$ which is substantially equal to $s+n-\hat{n}$. Since $\hat{n}$ is an estimate of n, this error signal $\epsilon$ is substantially comprised of only the desired signal s. This error signal $\epsilon$, which is the output audio signal, is fed back to the adaptive filter 31.

In its operation, the adaptive filter 31 cancels the common signal components between the reference audio signal (second broadband noise signal m) and the error signal $\epsilon$ by adaptively adjusting the amplitude, phase and spectral transfer function of the reference audio signal (m) to match the corresponding components in the error signal $\epsilon$. The convergence criterion used in the adaptive filter 31 is the least mean square error. Thus, the error signal $\epsilon$ is used to force the adaptive filter 31 to converge to a least mean square estimate $\hat{n}$ of the first broadband noise signal n contained in the primary audio signal. The filter 31 seeks to minimize the error signal $\epsilon$, but since its input, the reference audio signal (m), contains no components of the desired signal s in the primary channel 19, the filter 31 can only estimate the broadband noise n contained in the primary channel 19. As a result, the combiner 33 cannot cancel the desired signal s, but can only cancel broadband noise components (n and $\hat{n}$) that are common to both the primary and reference audio signals. By this means, the desired signal s is not affected by the broadband noise cancellation, and any output noise in the error signal $\epsilon$, after the filter 31 converges, can never be greater than the noise n.

When no broadband noise is present in the broadband IF signal, no noise components are common to the primary and reference audio signals and, as a result, the adaptive filter 31 automatically shuts itself off, while the primary (frequency) channel 19 only develops the desired audio signal s. Thus, regardless of whether or not broadband noise is present, the error signal $\epsilon$ (output audio signal) is substantially comprised of only the desired audio signal.

Unlike the operations discussed in some of the above-identified prior art patents, the desired signal s is not filtered or passed through any non-linear device, such as an inhibiter or gate, to achieve the noise cancellation.

The embodiment of FIG. 1 can be modified in accordance with the changes indicated in FIG. 2 to produce a second embodiment of the invention. More specifically the output of the preselector 13 can be directly applied as a selected broadband RF passband signal to the primary and reference channels 19 and 21.

This RF embodiment, as indicated in FIG. 2, could be utilized where a fixed, preselected RF passband signal is to be received at all times in such applications as, for example, microwave and data link communications. In these applications no IF frequency bandpass signal would have to be detected, since passbands within the fixed, preselected RF passband signal could be directly detected within the channels 19 and 21. Thus, the bandpass filters 23 and 27 would be implemented to respectively select first and second bands of frequencies within the passband of the preselected broadband RF signal. These first and second bands of frequencies can be respectively varied to be in adjacent, overlapping or separated portions of the frequency spectrum of the passband of the broadband RF signal. Channel selectivity in the RF embodiment is such that the selected second band of frequencies contains substantially no signal energy of either the desired signal or any other received signal (other than possibly noise).

In the RF embodiment, indicated in FIG. 2, any broadband noise would be present in the broadband RF passband signal being commonly applied to the inputs of the primary and reference channels 19 and 21. Otherwise, the operation of the primary and reference channels 19 and 21, adaptive filter 31 and combiner 33 are identical to those described in relation to the embodiment of FIG. 1.

FIG. 3 illustrates a modification that can be made to either of the embodiments of FIGS. 1 and 2 to produce a specific, discrete third embodiment of the invention.

In the discussion of this third embodiment, assume that the broadband passband signal (IF from FIG. 1 or RF from FIG. 2) being commonly applied to the inputs of the primary and reference channels 19 and 21 (FIG. 1) contains both a desired signal and an undesired broadband noise, such as impulse noise, atmospheric noise, electrical line noise or receiver front end noise.

It should be recalled that the second audio signal from the demodulator 29 substantially contains a second broadband noise m which is correlated with the noise n contained (with the desired signal s) in the first or primary audio signal (s+n) from the demodulator 25 (FIG. 1).

To reiterate, the invention makes use of the fact that the desired signal component s in the primary audio signal is not correlated with the second broadband noise m (in the second audio signal), but that the first broadband noise component n in the primary audio signal is correlated with the second broadband noise m. Note that the broadband noise signals m and n are correlated with each other by virtue of the assumption that they emanate from the same source, but are linearly modified prior to being demodulated in the channels 19 and 21.

In the embodiment of FIG. 3, the first or primary audio signal (s+n) is sampled by a sampler 34 to produce a discrete or sampled signal $s_i+n_i$, comprised of a desired signal sample $s_i$ and the undesired first broadband noise sample $n_i$. At the same time, the second audio signal, which is substantially comprised of the second broadband noise m is sampled by a sampler 37 to produce a discrete noise sample $m_i$. Each of the samplers 34 and 37 can be, for example, an analog-to-digital converter or a sample and hold implementation such as a charge coupled diode mechanization.

The adaptive transversal filter 31 is utilized to adjust the phase and amplitude of the noise sample $m_i$ across all frequencies in the passband of the reference channel 21 to develop the reference audio signal or estimate $\hat{n}$ of the first broadband noise sample $n_i$. The reference audio signal or estimated noise sample $\hat{n}_i$ is subtracted from the primary audio sample $s_i+n_i$ in the combiner 33 to cancel the noise sample $n_i$. As a result, the output of the combiner 33 is a discrete audio error signal $\epsilon_i$ which is substantially comprised of the desired signal sample $s_i$.

The discrete audio error signal $\epsilon_i$ is converted to an output analog audio signal $\epsilon$ (or s) by a desampler 35. The desampler 35 can be, for example, a digital-to-analog converter or a zero-order hold implementation. The discrete audio error signal $\epsilon_i$ is also gain-scaled by a desired adaptation constant $\mu$ in a multiplier 36 before being fed back to adaptively adjust the filter coefficients of the adaptive transversal filter 31. Thus, in response to the discrete second broadband noise sample $m_i$ and to the gain-scaled discrete error signal sample $\mu \epsilon_i$, the filter 31 develops the reference audio signal or discrete noise sample estimate $\hat{n}_i$ which is used to cancel the undesired broadband noise $n_i$ from the primary audio signal.

Within the filter 31, the discrete noise signal $m_i$ from the sampler 37 is applied through a sequence of $Z^{-1}$ (one sample time delay) blocks $39_1, 39_2, \ldots, 39_N$ (which together form a delay line) to respectively develop various sample time delayed signals $m_{i-1}, m_{i-2}, \ldots, m_{i-N}$) at their equally time-spaced output taps $41_1, 41_2, \ldots, 41_N$, respectively. The number i represents the ith time instant or sample, and the number N represents the number of the last tap in the filter 31.

Respectively coupled to the taps $41_1, 41_2, \ldots, 41_N$ are coefficient computer circuits $43_1, 43_2, \ldots, 43_N$ for updating the weights or coefficients $\omega_{1,i}, \omega_{2,i} \ldots \omega_{N,i}$ as a function of the gain-scaled error signal, $\mu \epsilon_i$, from the multiplier 37. Since all of the coefficient computer circuits $43_1, 43_2, \ldots, 43_N$ are similar in structure and operation, only the circuit 43, will be discussed.

The coefficient computer circuit $43_1$ is comprised of a multiplier $45_1$, a summer $47_1$ and a one sample time delay block $49_1$. The sample time delayed signal $m_{i-1}$ from tap $41_1$ is applied to the multiplier $45_1$. The product signal $\mu \epsilon_i$, which is a function of the error $\epsilon_i$, is multiplied by the delayed signal $m_{i-1}$ in the multiplier $45_1$ to develop weight update signal associated with the tap $41_1$. This weight update signal, which at the present instant of time (i or now) is equal to $\mu \epsilon_i m_{i-1}$, is summed in the summer $47_1$ with the present value (at time instant i) of the presently updated coefficient or weight $\omega_{1,i}$ from the output of the one sample time delay block $49_1$. It should be noted that the output of the summer $47_1$ is the weight update signal $\omega_{1,i+1}$ at the present time i for the $\omega_{1,i}$ filter coefficient or weight that will occur at the next instant of time (i+1). The algorithm for determining the value of the updated weight or filter coefficient $\omega_{1,i}$ at the output of the summer $47_1$ for the next instant of time is given by the equation:

$$\omega_{1,i+1} = \omega_{1,i} + \mu \epsilon_i m_{i-1} \tag{1}$$

The output of the summer $47_1$ is applied to the input of the delay block $49_1$ with the output of the delay block $49_1$ being the filter coefficient $\omega_{1,i}$.

In this manner the coefficient computer circuits $43_1, 43_2, \ldots, 43_N$ develop the updated filter coefficients $\omega_{1,i}, \omega_{2,i} \ldots, \omega_{N,i}$. The sample time delayed signals $m_{i-1}, m_{i-2}, \ldots, m_{i-N}$ are respectively multiplied by these updated filter coefficients $\omega_{1,i}, \omega_{2,i} \ldots, \omega_{N,i}$ in multipliers $51_1, 51_2, \ldots, 51_N$ to develop adaptively weighted signals $\omega_{1,i} m_{i-1}, \omega_{2,i} m_{i-2}, \ldots \omega_{N,i} m_{i-N}$, respectively. These weighted signals from the multipliers $51_1, 51_2, \ldots, 51_N$ are summed together in a summation circuit 53 to develop a least mean square (LMS) estimate $n_i$ of the primary noise sample $n_i$.

The estimated sample $\hat{n}_i$ of the primary noise $n_i$ sample is subtracted from the primary audio signal sample $s_i + n_i$, in the combiner 33 to develop the error signal sample or signal remnant $\epsilon_i$, which is minimized in a LMS sense. This error signal $\epsilon_i$ is gain-scaled by the desired adaptation constant $\mu$ in the multiplier 36 to produce the product signal $\mu \epsilon_i$, which is fed back to the coefficient computer circuits $43_1, 43_2, \ldots, 43_N$ to adaptively adjust the weights or coefficients $\omega_{1,i} \omega_{2,i} \ldots, \omega_{N,i}$ of the adaptive transversal filter 31.

When the noises m and n are not correlated with each other, the adaptive transversal filter 31 "shuts off" by converging or adjusting all of its weights or coefficients $(\omega_{1,i}, \omega_{2,i}, \ldots, \omega_{N,i})$ to zero. Never will the converged adaptive filter 31 add noise power to the primary audio signal. The desired signal $s_i$ is never modified or distorted since it only passes through the combiner 33.

The adaptation constant $\mu$ of the filter 31 is related to the input power $P_s$ to the filter 31 and the adaptation time constant T (in samples) of the filter 31 by the expression $$T = 1/(2\mu P_s) \tag{2}$$

In order for the filter 31 to be stable, the following adaptation constant $\mu$ limits should be satisfied $$0 < \mu < 2/(NP_s) \tag{3}$$

where N=the number of taps in the filter 31 and $P_s$ is the filter input power $E\{m_i^2\}$.

The following equations mathematically define the overall operation of the embodiment of FIG. 3.

$$\hat{n}_i = \sum_{j=1}^{N} \omega_{j,i} m_{i-j} \tag{4}$$

where $m_{i-j}$ are past samples of the input second audio signal $m_i$ and $i = 1, 2, \ldots, N$.

The error signal $\epsilon_i$ developed from subtracting the estimated noise sample $\hat{n}_i$ from the primary audio signal $s_i + n_i$ is $$\epsilon_i = s_i + n_i - \hat{n}_i \tag{5}$$

The jth filter (31) coefficient at time sample 1+i is computed from the ith coefficient at time sample i as follows $$\omega_{j,i+1} = \omega_{j,i} + \mu \epsilon_i m_{i-j} \tag{6}$$

The invention thus provides an adaptive noise cancelling receiver which has the capability of substantially concelling broadband noise from a selected radio frequency passband which contains a desired signal component. The selected radio frequency passband can be downconverted to a broadband IF signal before being commonly applied to primary and reference frequency channels. In some applications the selected radio frequency passband can be directly applied as a broadband RF signal to the primary and reference frequency channels. The primary and reference frequency channels are responsive to the input broadband frequency signal for respectively generating primary and second audio signals, with the primary audio signal containing the desired signal in the presence of a first broadband noise and the second audio signal containing a second broadband noise that is correlated with the first broadband noise but not with the desired signal. The first and second broadband noises are correlated with each other since they emanate from the same source. An adaptive filter adjusts the phase and amplitude of the second broadband noise across all frequencies in the passband of the input broadband frequency signal to the reference channel to generate a reference audio signal which is an estimate of the first broadband noise. A combiner combines the primary and reference audio signals to substantially cancel out the first and second broadband noises and develop an output audio signal which substantially contains only the desired signal. When the first and second "broadband" noises are not correlated with each other, the adaptive filter turns off by converging its weights or coefficients to zero.

While the salient features have been illustrated and described in several embodiments of the invention, it should be readily apparent to those skilled in the art that modifications can be made within the spirit and scope of the invention as set forth in the appended claims.

I claim:

1. An adaptive noise cancelling receiver comprising:

means responsive to received radio frequency signals for selectively developing a desired broadband frequency signal containing a desired signal;

a first frequency channel responsive to the broadband frequency signal for generating a first audio signal in a first band of frequencies containing the desired signal in the presence of a first broadband noise;

a second frequency channel responsive to the broadband frequency signal for generating a second audio signal in a second band of frequencies containing a second broadband noise which is correlated with the first broadband noise;

an adaptive filter responsive to the second broadband noise and to an output audio signal for adaptively developing an estimate of the first broadband noise; and means for combining the estimate of the first broadband noise with the first audio signal to substantially cancel out the first and second broadband noises and develop the output audio signal, said output audio signal substantially containing only the desired signal.

2. The receiver of claim 1 wherein:

said first mentioned means for developing comprises means for selectively producing the desired broadband frequency signal, said desired broadband frequency signal being a broadband radio frequency signal which contains the desired signal.

3. The receiver of claim 2 wherein:

said first frequency channel includes a first bandpass filter for passing a first band of frequencies in a first part of the frequency spectrum of the broadband radio frequency signal, and a first demodulator for demodulating the first band of frequencies to develop the first audio signal; and said second frequency channel includes a second bandpass filter for passing a second band of frequencies in a second part of the frequency spectrum of the broadband radio frequency signal, and a second demodulator for demodulating the second band of frequencies to develop the second audio signal.

4. The receiver of claim 3 wherein:

said adaptive filter is an adaptive transversal filter having adjustable coefficients, said adaptive transversal filter changing each of its coefficients as a function of the output radio signal in order to adaptively develop a least mean square estimate of the first broadband noise.

5. The receiver of claim 1 wherein said developing means comprises:

means responsive to the received radio frequency signals for selecting a desired radio frequency passband containing a desired radio frequency signal; and means for converting the desired radio frequency passband to the desired broadband frequency signal, said desired broadband signal being a broadband intermediate frequency signal which contains the desired signal.

6. The receiver of claim 5 wherein:

said first frequency channel includes a first bandpass filter for passing a first band of frequencies in a first part of the broadband intermediate frequency signal which contains the desired signal, and a first demodulator for demodulating the first band of frequencies to develop the first audio signal; and said second frequency channel includes a second bandpass filter for passing a second band of frequencies in a second part of the frequency spectrum of the broadband intermediate frequency signal, and a second demodulator for demodulating the second band of frequencies to develop the second audio signal.

7. The receiver of claim 6 wherein:

said adaptive filter is an adaptive transversal filter having adjustable coefficients, said adaptive transversal filter changing each of its coefficients as a function of the output audio signal in order to adaptively develop a least mean square estimate of the first broadband noise.

8. An adaptive noise cancelling receiver comprising:

band select means for selecting a desired radio frequency passband containing a desired radio frequency signal;

means for converting the desired radio frequency passband to a broadband intermediate frequency signal;

a primary frequency channel responsive to the broadband intermediate frequency signal for developing a first audio signal containing a desired audio signal in a first frequency band and a first broadband audio noise signal;

a reference frequency channel responsive to the broadband intermediate frequency signal for developing a second audio signal in a second frequency band containing a second broadband noise signal which is correlated with the first broadband noise signal;

filter means responsive to the second broadband noise signal and to an output audio signal for developing an estimate of the first broadband noise signal; and means for combining the estimate of the first broadband noise signal with the first audio signal to develop the output audio signal, said output audio signal containing the desired signal and substantially no broadband noise signals.

9. The receiver of claim 8 wherein:

said primary frequency channel includes a first filter having a first passband and a first audio demodulator responsive to the first passband for developing the first audio signal; and said adjacent reference frequency channel includes a second filter having a second passband and a second audio demodulator responsive to the second passband for developing the second audio signal.

10. In a receiver having an antenna, a preselector, a converter and an intermediate frequency amplifier for producing a broadband intermediate frequency signal containing a desired signal and undesired broadband noise, the combination comprising:

a first frequency channel, having a first passband, being responsive to the broadband intermediate frequency signal for developing a first audio signal containing a desired signal and a first broadband noise signal;

a second frequency channel, having a second passband, being responsive to the broadband intermediate frequency signal for developing a second audio signal containing a second broadband noise signal which is correlated with the first broadband noise signal;

means responsive to the second broadband noise signal and to an output audio signal for developing a least mean square estimate of the first broadband noise signal; and a combiner responsive to the first audio signal and the estimate of the first broadband noise signal for developing the output audio signal, said output audio signal containing the desired signal and substantially no broadband noise signals.

11. The combination according to claim 10 wherein:

said first frequency channel includes a first filter for passing a first band of frequencies in a first part of the frequency spectrum of the broadband intermediate frequency signal, and first means for demodulating the first band of frequencies to develop the first audio signal; and said second frequency channel includes a second filter for passing a second band of frequencies in a second part of the frequency spectrum of the broadband intermediate frequency signal, and second means for demodulating the second band of frequencies to develop the second audio signal.

12. A receiver for cancelling broadband noise, said receiver comprising:

band select means for selecting a broadband radio frequency signal containing a desired signal;

a first frequency channel having a first passband and being responsive to the broadband radio frequency signal for developing a first audio signal containing the desired signal and a first broadband noise signal;

a second frequency channel having a second passband displaced from said first passband and being responsive to the broadband radio frequency signal for developing a second audio signal containing a second broadband noise signal which is correlated with the first broadband noise signal;

means responsive to the second broadband noise signal and to an output audio signal for developing an estimate of the first broadband noise signal; and means for combining the estimate of the first broadband noise signal with the first audio signal to develop the output audio signal, said output audio signal containing the desired signal and substantially no broadband noise signal.

13. The receiver of claim 12 wherein:

said first frequency channel includes a first bandpass filter serially coupled to a first demodulator; and said second frequency channel includes a second bandpass filter serially coupled to a second demodulator.

14. An adaptive noise cancelling receiver comprising:

means responsive to received radio frequency signals for selecting a radio frequency passband containing a desired radio frequency signal and any undesired broadband noise that may be present;

first and second bandpass filters for respectively passing first and second bands of frequencies in adjacent portions of the frequency spectrum of the desired radio frequency passband;

first and second demodulators for respectively demodulating the first and second bands of frequencies to develop first and second audio signals respectively, said first audio signal containing a desired audio signal and any undesired broadband first noise signal present in the first band of frequencies, said second audio signal containing any undesired broadband second noise signal present in the second band of frequencies, said first and second noise signals being correlated with each other and being derived from portions of any undesired broadband noise that may be present in the frequency spectrum of the desired radio frequency passband;

an adaptive transversal filter having adjustable coefficients, said adaptive transversal filter being responsive to the second noise signal and to an output audio signal for changing each of its coefficients as a function of the output audio signal in order to adaptively develop a least mean square estimate of the first noise signal; and means for combining the estimate of the first noise signal with the first audio signal to substantially concel out the first and second noise signals and develop the output audio signal, said output audio signal substantially containing only the desired audio signal.

15. An adaptive noise cancelling receiver comprising:

means responsive to received radio frequency signals for selecting a desired radio frequency passband containing a desired signal;

means for converting the desired radio frequency passband to a broadband intermediate frequency signal which includes the desired signal and any broadband noise that may be present;

first and second bandpass filters for respectively passing first and second bands of frequencies in different portions of the frequency spectrum of the broadband intermediate frequency signal;

first and second demodulators for respectively demodulating the first and second bands of frequencies to develop first and second audio signals respectively, said first audio signal containing the desired signal and any undesired broadband first noise signal present in the first band of frequencies, said second audio signal containing any undesired broadband second noise signal present in the second band of frequencies, said first and second noise signals being correlated with each other and being derived from portions of any undesired broadband noise that may be present in the frequency spectrum of the broadband intermediate frequency signal;

an adaptive transversal filter having adjustable coefficients, said adaptive transversal filter being responsive to the second noise signal and to an output audio signal for changing each of its coefficients as a function of the output audio signal in order to adaptively develop a least mean square estimate of the first noise signal; and means for combining the estimate of the first noise signal with the first audio signal to develop the output audio signal by substantially cancelling out any first and second noise signals that may be present, said output audio signal substantially containing only the desired signal.

16. A machine method for cancelling broadband noise in a received radio frequency signal comprising the steps of:

changing a first portion of the received radio frequency signal into a first audio signal containing a desired signal and a first broadband noise signal;

changing a second portion of the received radio frequency signal into a second audio signal containing a second broadband noise signal correlated with the first broadband noise signal;

adaptively filtering the second broadband noise signal in response to an audio output signal to develop an estimate of the first broadband noise signal; and combining the estimate of the first broadband noise signal with the first audio signal to substantially develop only the audio output signal by cancelling out the first and second noise signals.

* * * * *